Patented July 29, 1941

2,251,229

UNITED STATES PATENT OFFICE 2,251,229

ALKYLAMINE SALTS OF METHAZONIC ACID

Samuel B. Lippincott, Terre Haute, Ind., assignor to Commercial Solvents Corporation, Terre Haute, Ind., a corporation of Maryland No Drawing. Application July 5, 1940, Serial No. 344,069

6 Claims. (Cl. 260—501)

My invention relates to an improved process for the preparation of methazonic acid salts, and more specifically to the preparation of a new class of compounds, the salts of methazonic acid with alkylamines.

It has previously been known that inorganic alkalies cause nitromethane to undergo a condensation with the formation of alkali salts of methazonic acid. However, the processes previously described have been relatively inefficient. For example, Dunstan et al. (Jour. of Chem. Soc. 77, 1262), report that by repeated action of successive quantities of aqueous ammonia on nitromethane, a total yield of approximately 53% of the ammonium salt of methazonic acid was obtained.

I have now discovered that the alkylamines, although weaker bases than the inorganic alkalies, are more effective in converting nitromethane into methazonic acid. In this reaction two moles of nitromethane and one mole of the amine react to form the alkylammonium salt of methazonic acid in accordance with the following equation:

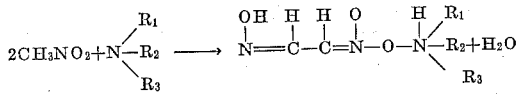

in which $R^1$ represents an alkyl group and $R^2$ and $R^3$ represent hydrogen or alkyl groups.

The alkylammonium salts are stable compounds which may be purified easily by recrystallization. Free methazonic acid, on the other hand, is quite unstable and rapidly polymerizes. The alkylammonium salts may be stored as such, and the free methazonic acid may then be obtained, when desired, by acidifying the salt with a mineral acid. In this manner very pure methazonic acid can be obtained for use in any of the known reactions of this compound.

Any of the alkylamines may be employed in my process, but I prefer to utilize the lower alkylamines, for example, ethylamine, diethylamine, triethylamine, propylamines, butylamines, and the like. The amount of amine to be employed is not critical, but of course at least the theoretical quantity of one-half mole per mole of nitromethane should be utilized to insure full yields. I prefer in general to employ a considerable excess of the amine, for example, one mole of amine per mole of nitromethane.

The reaction may be effected in the absence of a solvent, but I prefer to carry out the reaction in the presence of water or other suitable solvent. The reaction may advantageously be effected in a medium which is a solvent for the reactants or the initially-formed nitromethane salt, and in which the resulting methazonic acid salt is relatively insoluble. Water, however, serves very satisfactorily as the solvent medium.

The reaction should be effected at relatively low temperatures, e. g., below 50° C., and preferably below ordinary room temperatures. Unduly high temperatures tend to decrease the yields, whereas unduly low temperatures reduce the speed of reaction. In general, temperatures from −10° C. to +20° C., are satisfactory for this purpose, and I prefer to effect the reaction at approximately 0° C.

My invention may be further illustrated by the following specific example:

Example

Nitromethane, n-butylamine and water in the proportion of 1 mole of nitromethane, 1 mole of butylamine, and one-half mole of water were mixed and allowed to stand for a day at room temperature. The mixture was then cooled to 0° C., and held at this temperature until no further precipitate was formed. The product was separated by filtration, and was recrystallized from a mixture of ethyl acetate and ethyl ether. The recrystallized product amounted to 77% of the theoretical yield of the butylammonium salt of methazonic acid. The product had a melting point of 124–125° C., and a nitrogen content of 22.54% (theoretical 23.58%).

On acidifying the salt with sulfuric acid, extracting with ether, and removing the ether by distillation at reduced pressure, free methazonic acid was obtained. On recrystallization from chloroform, white crystals were obtained which melted at 68–70° C., with decomposition, and which showed the characteristic property of methazonic acid in rapidly polymerizing to a red resin.

It is to be understood, of course, that the above example is merely illustrative and does not limit the scope of my invention. Any of the alkylammonium salts of methazonic acid may be prepared by substituting other alkylamines for the butylamine employed in the example, and the reaction conditions may be varied in accordance with the previous description. In general it may be said that the use of any equivalents or modifications of procedure which would naturally occur to one skilled in the art, is included within the scope of my invention.

My invention now having been described, what I claim is:

1. In a process for the production of alkyl-ammonium salts of methazonic acid, the step which comprises subjecting nitromethane to the action of an alkylamine.

2. In a process for the production of alkyl-ammonium salts of methazonic acid, the step which comprises subjecting nitromethane to the action of an alkylamine at a temperature below 50° C.

3. In a process for the production of alkyl-ammonium salts of methazonic acid, the step which comprises subjecting nitromethane, in the presence of water, and at a temperature below 50° C., to the action of an alkylamine in which the alkyl groups contain from 2 to 4 carbon atoms.

4. In a process for the production of alkyl-ammonium salts of methazonic acid, the step which comprises subjecting nitromethane to the action of greater than the theoretical equivalent quantity of n-butylamine, in the presence of water, and at a temperature of −10° to 20° C.

5. An alkylammonium salt of methazonic acid having the formula:

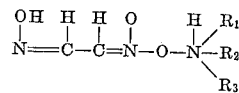

in which $R^1$ represents an alkyl group and $R^2$ and $R^3$ are chosen from the class consisting of hydrogen and alkyl groups.

6. Butylammonium methazonate having the formula:

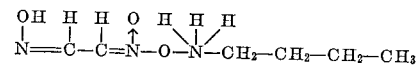

SAMUEL B. LIPPINCOTT.